United States Patent [19]

Wolff

[11] 3,739,370

[45] June 12, 1973

[54] PLOTTING PROJECTOR

[75] Inventor: Hanns H. Wolff, Orlando, Fla.

[73] Assignee: The United States of America as represented by the Secretary of the Navy, Washington, D.C.

[22] Filed: Oct. 27, 1971

[21] Appl. No.: 192,862

Related U.S. Application Data

[63] Continuation-in-part of Ser. No. 886,859, Dec. 22, 1969, abandoned.

[52] U.S. Cl. .............................. 340/324 R, 350/285
[51] Int. Cl. .............................................. G08b 5/36
[58] Field of Search ............... 340/324 A, 324 AD, 340/174.1 P, 324 R

[56] References Cited
UNITED STATES PATENTS
3,406,387  10/1968  Werme .......................... 340/324 A
2,832,064  4/1958  Lubkin ........................ 340/174.1 P Primary Examiner—David L. Trafton
Attorney—Richard S. Sciascia, John W. Pease and Harvey A. David

[57] ABSTRACT

A plotting projector wherein analog signals are periodically sampled, converted to pulse position word form and recorded for repeated playback and demodulation to provide beam deflection signals for describing a periodically updated trace at a repetition rate above the flicker rate.

3 Claims, 4 Drawing Figures

Patented June 12, 1973

PLOTTING PROJECTOR

CROSS REFERENCES TO RELATED APPLICATIONS

This application is a continuation-in-part of my co-pending application Ser. No. 886,859, filed Dec. 22, 1969, now abandoned and assigned to the assignee hereof.

BACKGROUND OF THE INVENTION

This invention relates to plotting projectors useful in displaying on a viewing screen a trace which is a function of a plurality of parameters, one or more of which change as a function of time. For example, it is desirable in tracking or training procedures to be able to display a trace which presents a history of the movements (position coordinates as the changing parameters) of either a real or simulated vehicle such as a ship or aircraft.

In this regard the movements to be displayed are often not pre-programmed or recorded, but are occurring events, for example the progress of a simulated vehicle which undergoes speed and/or course changes under the control of a student reacting to various cues and problems. Accordingly it is desirable to have a display projector which can respond to analog inputs in a real time or nearly real time manner to generate either a continuously changing historical trace as the coordinates of position change, or a trace which is periodically updated, for example once each minute.

One type of plotting projector currently in use employs a glass slide which is covered with an opaque film into which a trace is inscribed by a stylus which is moved by motor driven screw means in accordance with analog voltage inputs representing the parameters to be displayed. A light source and projection optics are used to continuously project the changing trace on a screen. The projector disclosed in U.S. Pat. No. 2,859,659 of D. M. Fenske, et al is representative of such projectors. Disadvantages of projectors of that type include the excessive degree of care the stylus requires, the difficulty involved in replacing and adjusting it, and the fact that the coated slide has to be replaced for each new display.

Television systems have been proposed which utilize high intensity light beams, notably one or more laser beams, which are deflected by various electrically driven means to produce a raster-like scan of a viewing screen and which beams are modulated to produce a desired image. Typical of these systems are those disclosed in U.S. Pat. No. 3,303,276 to A. V. Haeff, and in Bulletin No. DLA-1324, dated Jan. 1966 of the Apparatus Division of Texas Instruments, Incorporated of Dallas, Texas. It would be desirable to utilize a laser beam, because of its intensity, to describe a trace or curve as a plotting projector for tracking or training purposes as outlined above. The existing laser display devices, however, use a scanning format or raster which, like conventional cathode ray tube television, materially reduces the percentage of time which would be used by the beam for writing purposes when used as a plotting projector. Moreover, the T.V. type systems require relatively high frequency, large bandwidth electronic equipment, very fast acting beam modulation and deflection means, and would require an expensive and complex means for converting into conventional television video signals the parameters to be displayed as an historical trace or curve.

SUMMARY OF THE INVENTION

With the foregoing in mind, it is a principal object of this invention to provide an improved plotting projector which utilizes a laser beam to provide a visual trace on a screen which will show, by periodic changes, the effects of a plurality of variable parameters, for example changing x and y coordinates of a moving vehicle.

As another object the invention aims to accomplish the foregoing while avoiding the aforementioned requirements attendant raster type of scanning. In accordance with this invention a laser beam is caused to be repeatedly deflected to describe substantially only the desired trace or curve rather than to scan an entire screen. The repetition rate can thereby be reduced to a frequency just above the flicker rate. That is to say, the laser beam is required to repeat the trace at a repetition rate which is only often enough so that the persistence of vision of an observer will make the trace appear to be steady or constantly present. The repetition rate may be in some instances as low as 16 per second, although rates of say 30 to 60 per second are preferred and therefore are well within the capability of the less expensive and most reliable forms of existing galvanometrically driven mirror type deflection means, and within the capability of existing shutter or electrical light valve means for interrupting the beam during flyback or retrace periods.

Another object of the invention is the provision, in a plotting projector having electrically driven beam deflection means, of novel circuitry for generating deflection signals which cause a trace to be repeated at a repetition rate just above the flicker rate, and which effect changes in the trace periodically to update the trace in accordance with periodically sampled analog signals representative of the changing parameters to be displayed. The periodic changes or updatings occur at intervals each of which encompass a plurality of trace repetitions. For example, at a repetition rate of 30 traces per second, and an updating of once each minute, the trace would be repeated some 1,800 times between each updating. In the exemplary situation where the parameters displayed represent changing position of a vehicle, at each updating the trace will lengthen in accordance with advance of the vehicle.

Yet another object of the invention is the provision of a plotting projector of the foregoing character which utilizes, in a novel combination, elements such as modulators, recording and playback means, demodulators, and various other electronic elements such as flip-flops, gates and the like, all of which are readily available and of themselves well understood by those skilled in the art to which the invention pertains.

The invention may be further said to reside in certain novel combinations and arrangements of parts which cooperate to provide the aforementioned objects and advantages as well as others which will become apparent from the following description of a preferred embodiment of the invention.

DESCRIPTION OF THE PREFERRED EMBODIMENT

Figure 1:
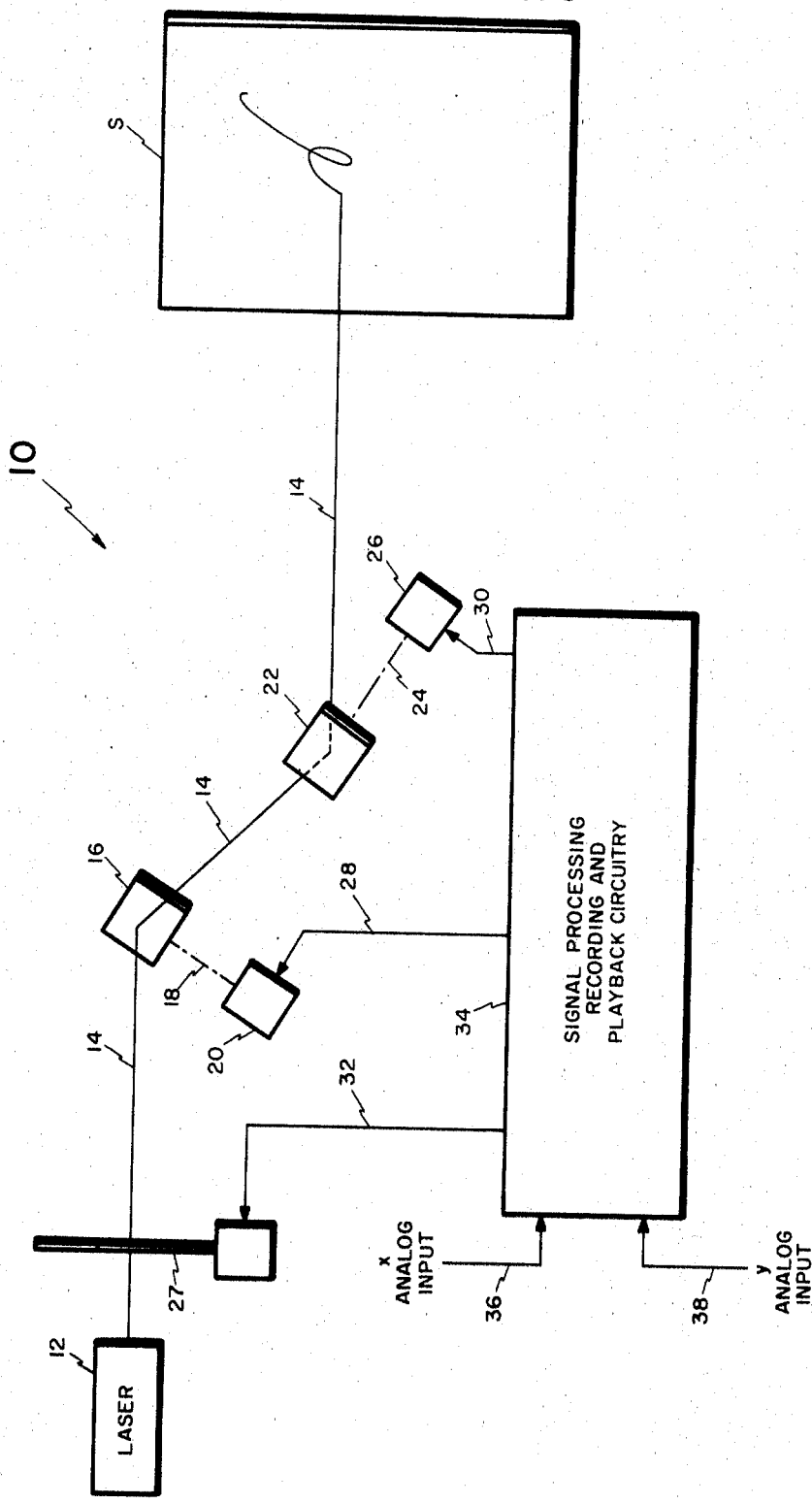
FIG. 1 is a diagrammatic illustration, partly in block form showing a plotting projector embodying the invention.

In the form of the invention illustrated in FIG. 1 a plotting projector, generally indicated at 10, comprises a high intensity light source preferably in the form of a laser 12 which emits a collimated light beam 14. The beam 14 impinges on and is adapted to be variably deflected by first (or x) deflection means including a mirror 16, the rotational position of which about its axis 18 is controlled by a galvanometric drive means 20. The beam 14, deflected from the mirror 16, is adapted to be deflected in a different direction by a second (or y) deflection means including a mirror 22, the rotational position of which about its axis 24 is controlled by a galvanometric drive means 26. The mirror 22 finally projects the light beam onto a display screen S. The rotational axes 18 and 24 are preferably orthagonal to each other.

A shutter means, generally indicated at 26, may be provided which may be of mechanical or electro-optical (Kerr-Cell) type to interrupt or otherwise modulate the beam 14, for example during the blanking period of the system for example during parking and/or return to the start of the next trace. Instead of shutter means, the light source could, of course, be turned off during the blanking period if the type of the light source permits the then required short ignition time.

The foregoing portions of the plotting projector 10 are to be recognized as being known heretofore, but are described as illustrative of one type of beam forming and deflection means suitable for use in projectors embodying the invention.

The galvanometric drive means 20 and 26 of the first and second deflection means, and the shutter means 26, receive their respective electrical command signals as indicated by flow lines 28, 30, and 32 from signal processing, recording and playback circuitry 34. The signal processing, recording and playback circuitry 34, hereinafter referred to at times simply as the circuit 34, receives as its inputs, for example, X and Y coordinate information in analog volt form and represented by lines 36 and 38.

The circuit 34, which will presently be described in more detail with reference to FIG. 2, samples the x and y analog inputs, converts the sampled data to pulse position code modulated form, records it, repeatedly plays the recorded data back at a selected repetition rate above the flicker threshold, e.g., 30 per second, and demodulates each playback of the data to produce x and y deflection voltages to drive the deflection means. After a predetermined period, say 1 minute, another sample of each of the x and y analog inputs is taken, modulated, and recorded so as to immediately follow the previously recorded pulse position representation of the x or y sample, respectively. Both recordings of the x data and both recordings of the y data, respectively, are then repeatedly played back and demodulated to produce deflection voltages. This procedure serves to provide an apparently steady trace which grows in length as it is periodically updated to show progress, for example, of a moving vehicle.

Figure 2:
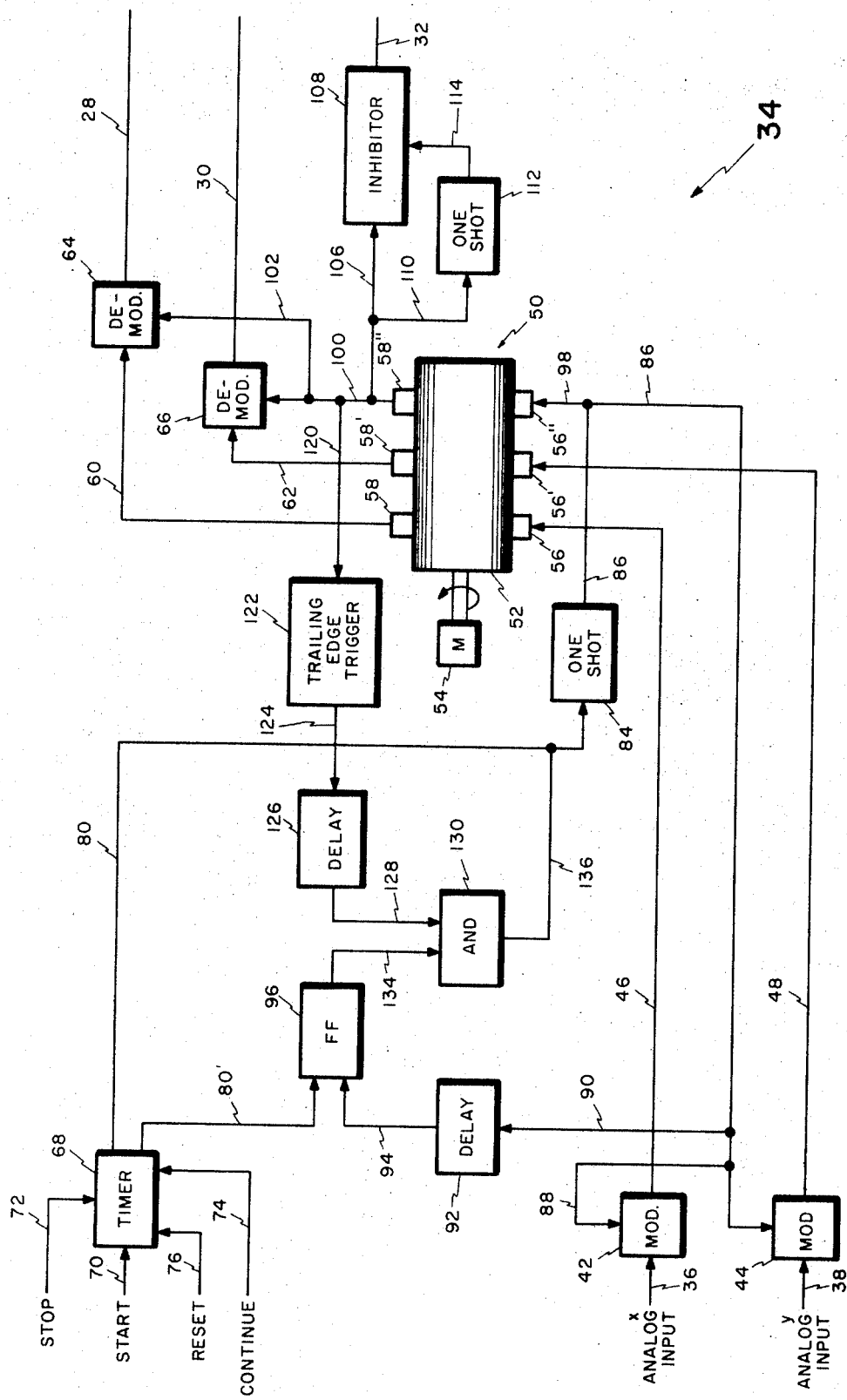
FIG. 2 is a diagrammatic illustration in block form showing details of the signal processing, recording, and playback circuitry of the projector of FIG. 1.

Referring now to FIG. 2, the circuit 34 comprises first and second pulse position modulators 42 and 44, connected to receive the analog input signals on lines 36 and 38, respectively. These analog signals may represent any parameters for which it is desired to render a projected presentation, for example the coordinates of positions of a ship or vehicle in a tactical training situation. Thus, for this example, consider the signal on line 36 to be a voltage level analogous of the x coordinate of a ship's position, and that on line 38 to be a voltage level analogous of the 4 coordinate of the ship's position. These analog voltages change with time, of course, if it is considered that the ship is moving and follows various courses.

The pulse position modulators 42 and 44, which are under the control of synchronizing signals generated in a manner which will become apparent as the description proceeds, are adapted to periodically convert a sample of each of the analog signal inputs thereto into pulse position word form on output lines 46 and 48. The periodic outputs of the modulators 42 and 44 are stored by recording means, generally indicated at 50, capable of repetitive readout at a repetition rate above the flicker threshold.

The recording means 50 comprises a rotary magnetic memory disk or drum 52 driven by a motor 54. The drum 52 has associated therewith a number of recording (write) heads 56, 56', 56'' as well as a like number of corresponding playback (read) heads 58, 58', 58''. The outputs of the pulse position modulators 42, 44 are applied via lines 46, 48 to the recording heads 56, 56', respectively, for recording on the drum 52 as it is rotated by the motor 54.

The information stored on the drum 52 by recording heads 56, 56' is adapted to be read as it passes the corresponding playback heads 58, 58'. The heads 58, 58' are connected as shown by lines 60, 62 to pulse position demodulators 64 and 66, respectively. The demodulators, which receive timing or sync signals as will later be described, convert the recorded pulse information into deflection signals as outputs on lines 28 and 30 to the laser beam deflection means of FIG. 1.

It should be noted at this point that it is an important feature of the invention to provide timing of the recording of the updating outputs of the modulators so that each additional recording from a given one of the modulators immediately follows the preceding recording in its position on the drum 52. The result is that as time progresses through a series of such updating recordings, the total recorded data accumulates on the drum 52 and is converted to deflection signals upon each rotation of the drum.

The recording means 50 and a timing pulse generator 68, hereinafter referred to as the timer 68, form part of a timing and synchronizing system for the modulators 42 and 44, for the demodulators 64 and 66, and also for the operation of the shutter means 26, all as will be presently described. The timer 68 may be a clock means of any conventional type which, after receiving a starting signal as indicated by line 70, releases timing pulses at regular intervals, for example every minute a timing pulse of 5 microseconds duration. Such a timer may conveniently be of the synchronous clock motor driven variety and is desirably subject to various other control signals including a "stop" signal represented by line 72, a "continue" signal represented by line 74, and a "reset" signal represented by line 76. The stop and continue functions are particularly useful when the projector is being used as a training aid so that the instructor can "freeze" the problem situation, make explanations, point out student errors or the like, and then continue the projected action. The reset signal, of course, permits a new start of a projection sequence. The start, stop, and continue functions may in some instances be effected by a single control switch.

The timer 68 releases over one line 80 the first or initial timing pulse which is applied to a sync signal generator which may conveniently be a one-shot multivibrator 84. The one-shot 84 provides a resulting output of predetermined duration which serves as an initial sync signal which is applied via lines 86 and 88 to the pulse position modulators 42 and 44 to enable their sampling and conversion of the analog inputs thereto into pulse position word form for recording on the drum 52 by heads 56 and 56'.

It is advantageous in this system to use pulse position modulation so that all samplings of the $x$ and $y$ analog data will result in pulse position word outputs of equal length, the differences in data being represented, of course, by the positions of pulses within each word. Moreover, it is advantageous to have each data word of the same length as the sync pulse output of the one-shot 84.

For a purpose later explained, the sync signal on line 86 is also applied via a line 90, a delay line 92, and line 94 to the reset terminal of a flip-flop 96. The delay imposed by the delay line 92 is conveniently from one to several times the duration of the initial sync signal.

The initial sync signal from the one-shot 84 is also applied via a line 98 to the recording head 56" for recording on the drum 52. This recording of the sync pulse will occur at substantially the same time as the recordings of the data by heads 56, 56'. The playback head 58" supplies a playback of the recorded sync pulse via lines 100 and 102 to the demodulators 64 and 66 where it serves as a reference for demodulation of the recorded pulse position words played back via heads 58, 58' to the demodulators.

The demodulated outputs on lines 28 and 30 constitute $x$ and $y$ deflection voltages which are applied to the galvanometric drives 3 and 5 causing the mirrors to be moved to positions which will direct the beam 14 to a spot on the screen corresponding to the position of the vehicle whose progress is being depicted at the time the samples were taken from the $x$ and $y$ inputs. With each revolution of the drum 52, the recorded pulse position words are replayed by the heads 58, 58' and the recorded sync signal is replayed by the head 58". Accordingly, the mirrors of the deflection means will be repeatedly positioned to direct the beam at the mentioned spot. After each such deflection the mirrors are returned to parking positions as is the character of the galvanometric drive means.

The invention includes means for generating the shutter command signal on line 32 to the shutter means so that the beam 14 is passed to illuminate the screen only at the proper times. Put another way, the shutter is operated to interrupt the beam during the times when the deflecting mirrors are travelling from the end of a trace to the parking position and/or from the parking position to the beginning of a trace. To this end, the sync signal output from playback head 58" is fed as shown by line 106 to an inhibitor 108 and as shown by line 110 to a one-shot 112. The output of the one-shot is applied as shown by line 114 as an inhibiting input to the inhibitor 108. As will presently be made apparent, the signal output of head 58" increases in duration with each updating of the trace being displayed. Accordingly, the one-shot 112 serves to inhibit passage of a predetermined initial portion of the sync output of head 58" which corresponds to movement of the deflection mirrors from the parking position to the beginning of the trace. From that point in time on, the sync output from head 58" is passed by the inhibitor 108 as the "shutter open" signal on line 32. When the sync output terminates for each revolution of the drum, the shutter will close so that the beam will not trace its return to the parking position.

Now, after the mentioned period of one minute, during which the data originally recorded by heads 56 and 56' has been played back, demodulated, and displayed as an initial increment of trace at a rate of thirty times per second, the circuit 34 will operate to update the trace by causing additional samples of the x and y inputs to be converted to pulse position word form and recorded on the same tracks as the originally recorded data on the drum 52 and immediately following the original data.

To accomplish this the sync signal output on line 100 from head 58" is applied as shown via line 120 to a trailing edge trigger 122. The trigger 122 responds to the trailing edge of the sync signal output of head 58" to initiate an output pulse which is fed via line 124, a delay line 126, and line 128 as one input to an AND gate 130. This occurs upon each revolution of the drum 52. However, the AND gate 130 receives its other, enabling input only once each minute in the following manner.

The timer 68 releases the earlier mentioned one-a-minute timing pulse via a line 80' to the set terminal of the flip-flop 96 which thereupon provides an output via line 134 as the enabling input to the AND gate 130.

With the AND gate 130 so enabled, the following, delayed output of the trailing edge trigger 122 will be passed via lines 136 and 80 as a triggering input to the one-shot 84. The one-shot 84 thereupon generates a new sync signal which is recorded by the head 56" and is also applied to the modulators 42, 44 causing them to convert a new sample of the $x$ and $y$ analog inputs into pulse position word form for recording by heads 56, 56'. The new sync signal is also applied by delay line 92 to reset the flip-flop 96 in readiness for the next updating signal from the timer 68.

It should be noted here that the delay line 126 introduces a delay equalling the time required for the drum to rotate to such a position that the new pulse position words and the new sync signal will be recorded on their respective tracks in positions immediately following the originally recorded pulse position words and sync signal. This process is repeated at each one minute interval so that the stored data and corresponding sync signals accumulate on the drum 52.

It should also be noted that the sync signals and the pulse words in the various recorded series should be placed as close to one another as possible to insure smoothness in appearance of the trace throughout its length, as a practical matter some overlap or some spacing can be tolerated. In the cases where any spacing occurs between the recorded sync signals of that series, the trailing edge trigger 122 and the one-shot 112 must have a finite response time which exceeds the time of the spaces between the recorded sync signals. This, of course, will prevent erroneous early generation of subsequent sync signal or breaking up of the trace by undesired shuttering.

With each revolution of the drum during the following minute, the accumulated x and y data will be replayed, demodulated, and displayed, as was the original data, at the repetition rate of 30 times a second. At the end of the second minute, the timer 68 releases another updating signal on line 80' causing the flip-flop 96 to enable the AND gate 130 in readiness for the output of delay 126 in response to the end of the accumulated sync signals. The output of delay 126 is again passed to initiate a new sync signal from one-shot 84 at precisely the correct time to effect recording of new data by heads 56, 56' in series with the existing recorded data.

Figure 3A:
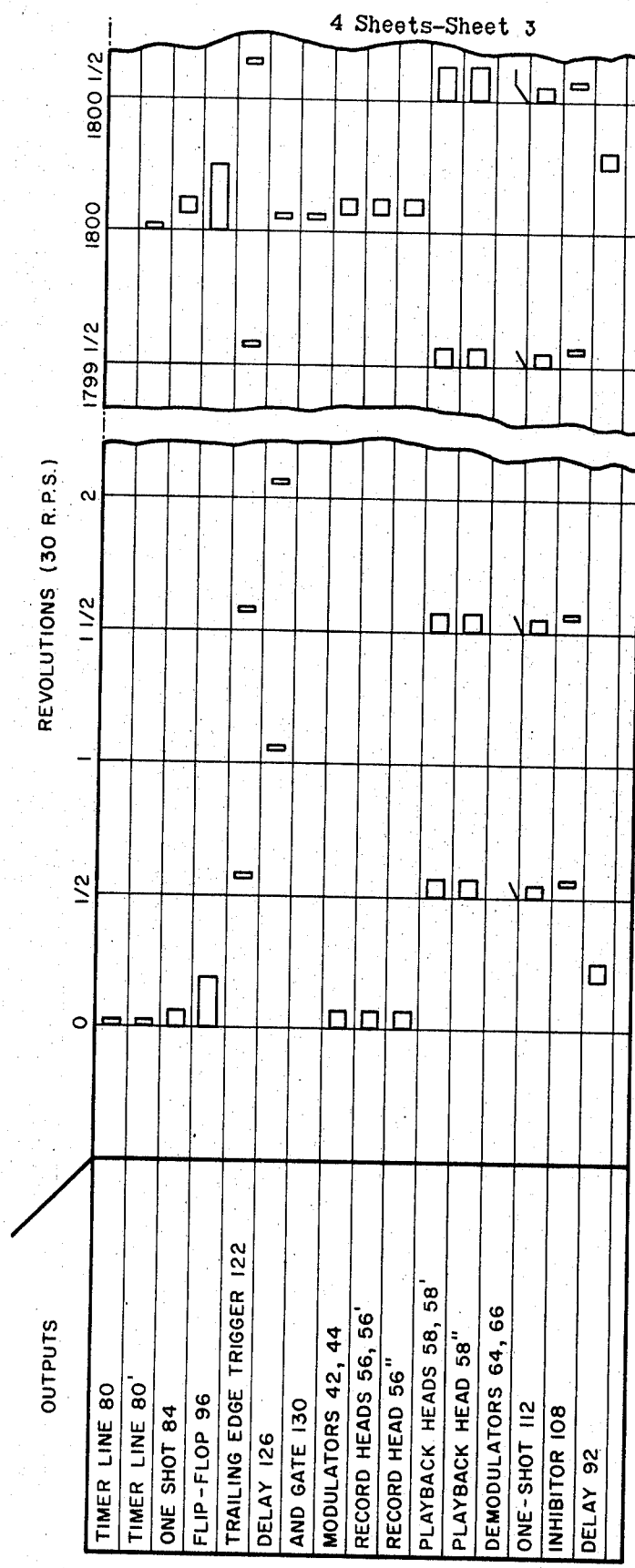
FIGS. 3a and 3b constitute a timing diagram graphically illustrating the relationships of the outputs of various elements of the circuitry of FIG. 2.
Figure 3B:
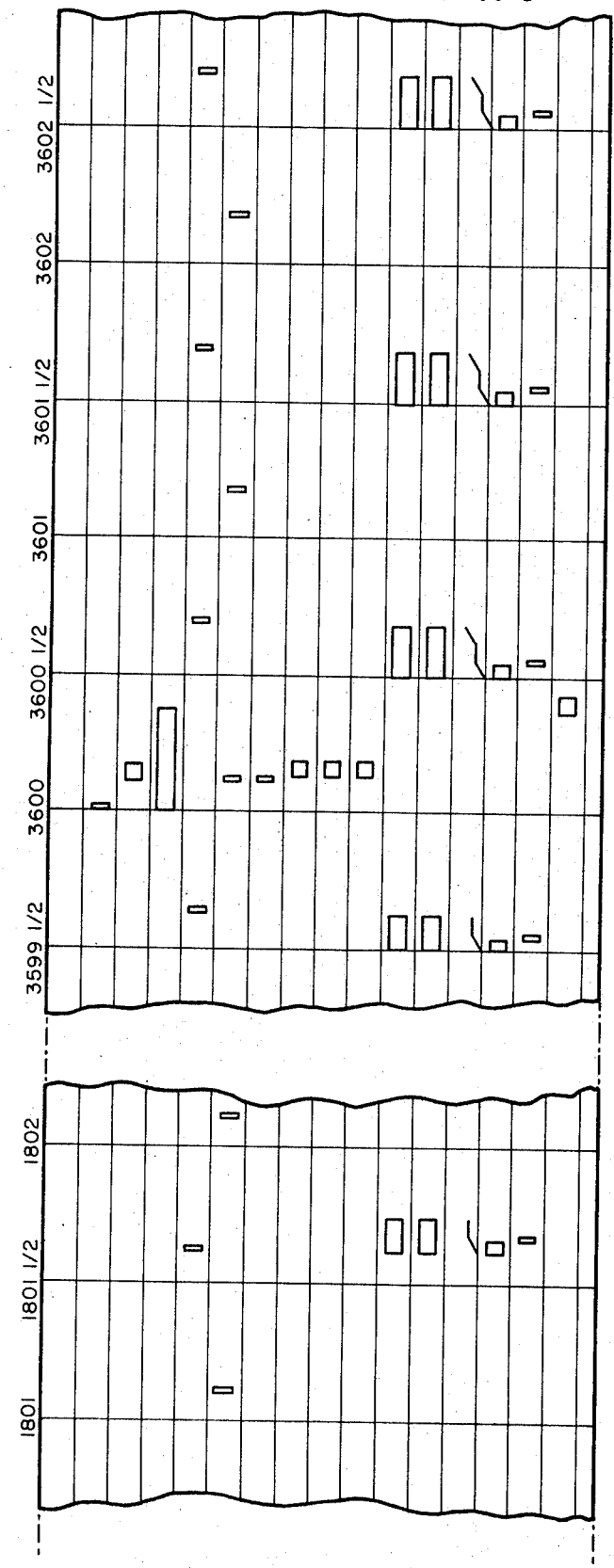

Referring now to the timing diagram of FIGS. 3a and 3b, the output times of the various elements of circuit 34 are shown with reference to revolutions of the drum 52. In this example it is supposed that the record and playback heads are diametrically located. This is for clarity in description only and is not a requirement.

Perusal of the diagram will reveal that the first sync signal output of one-shot 84 starts substantially at zero time and is recorded as the output of record head 56''. Simultaneously the modulators 42, 44 provide pulse words, one sync signal in length, which are recorded by the heads 56, 56'.

On the following half revolution and each full revolution thereafter and until the 1,800th (1 minute), the recorded pulse words are played back by heads 58, 58' for demodulation by demodulators 64, 66 (the voltage output of only one of the demodulators being shown in the diagram). Likewise, the recorded sync signal is repeatedly played back by head 58'' and actuates the trailing edge trigger to provide an output which is delayed for application to the AND gate 130. Because the flip-flop 96 is driven to reset by the output of delay 92 before the first output of the delay 126 arrives at the AND gate, no further recording takes place until the timer 68 releases another pulse on line 80', driving the flip-flop 96 to set condition and enabling the AND gate to pass the next delayed output of delay 126 to initiate a new sync signal output of one-shot 84.

It will be noted that this new sync signal begins at such a time that recording thereof by head 56'' adds it to the preceding recorded sync pulse. Thus, the playback by head 58'' grows in length at revolution 1,800 ½. Likewise the playback of the recorded pulse words by heads 58, 58' grow in length. This process is repeated at each minute or other chosen updating period.

From the foregoing example of one plotting projector embodying the invention it will be appreciated that the previously stated objects and advantages are achieved thereby. It will also be appreciated that the foregoing preferred embodiment is given by way of example only and that the invention may be otherwise embodied and may be used for other purposes such as generating alpha numeric symbols. Moreover, the simultaneous recording and display of more than two changing parameters may be accomplished by providing additional record and playback heads with associated modulators, demodulators, and deflection means. Of course other forms of deflection means, recording or storage means, and modulation and demodulation means can be used in the practice of the invention.

Obviously many modifications and variations of the present invention are possible in the light of the above teachings. It is therefore to be understood that within the scope of the appended claims the invention may be practiced otherwise than as specifically described.

What is claimed is

1. A plotting projector for displaying on a screen an historical and periodically updated trace representative of first and second parameters at least one of which changes with time, said projector comprising:

a high intensity light source for forming a beam;

electrically operable deflection means for causing said beam to be deflected to effect illumination of portions of the screen to which the beam is directed;

timer means for releasing an initial timing pulse and subsequent timing pulses at predetermined intervals thereafter;

sync signal generating means for generating an initial sync signal in response to said initial timing pulse, and for generating subsequent sync signals;

first and second modulation means, responsive to said initial and subsequent sync signals for converting initial and subsequent samples of analog signals representing said parameters into the form of initial and subsequent data words;

recording and playback means for storing in serial form said initial and subsequent data words and said initial and subsequent sync signals, and for playing back thereof at a repetition rate above the flicker rate for a viewer of said screen;

first and second demodulator means for demodulating each playback of said data words to form deflection signals for driving said deflection means;

logic means, responsive to each of said subsequent timing pulses and to the end of a playback of the last sync signal of the recorded series thereof, for causing said sync signal generator to produce the next of said subsequent sync pulses in timed relation to the repetition rate of said recording and playback means so that said next subsequent sync signal is recorded in series with and immediately following said last sync signal, and the corresponding subsequent data word outputs of said modulator means are recorded in series with and immediately following those already recorded to cause the recorded data words and sync signals to accumulate in said recording and playback means and the repetitively projected trace to be periodically updated;

means for generating beam control signals to cause said beam to illuminate said screen only from a predetermined time in each playback of the accumulated series of data words to the end thereof;

said modulation means comprising pulse position modulation means for rendering said data words as pulse position words, the lengths of said data words being equal to the lengths of said sync signals;

said sync signal generating means comprising a one-shot multivibrator for providing said sync signals of predetermined length;

means for providing an end of playback signal in response to the end of the last sync signal in the recorded series of sync signals;

delay means for introducing a delay in said end of playback signal;

flip-flop means responsive to each of said subsequent timing pulses to shift from a first to a second output condition; and AND gate means responsive to each coincidence of said second output condition and said delayed end of playback signal to render an output for triggering said one-shot multivibrator to generate one of said subsequent sync signals.

2. A plotting projector as defined in claim 1, and further comprising:

second delay means, responsive to each sync signal output of said one-shot multivibrator means, for resetting said flip-flop to said first condition.

3. A plotting projector as defined in claim 2, and wherein said means for generating said beam control signals comprises:

an inhibitor means connected to receive each played back series of said sync signals;

a second one-shot multivibrator means connected to receive each playback series of said sync signals for generating an inhibit signal of predetermined length beginning with the playback of the leading edge of said intital sync signal;

said inhibitor means being responsive to said inhibit signal to provide control signal beginning with the end of said inhibit signal and ending with the end of said series of sync signals;

said electrically operable deflection means comprising galvanometric drive means.

* * * * *